Oct. 10, 1967 P. THEVIS 3,346,179

APPARATUS FOR PREVENTING CALCULATIONS WITH NUMERICAL VALUES HAVING A NUMBER OF ORDERS GREATER THAN THE CAPACITY OF A CALCULATOR

Filed April 29, 1965

4 Sheets-Sheet 1

INVENTOR
Paul Thevis
BY Michael J. Striker
ATTORNEY

Oct. 10, 1967 P. THEVIS 3,346,179

APPARATUS FOR PREVENTING CALCULATIONS WITH NUMERICAL VALUES HAVING A NUMBER OF ORDERS GREATER THAN THE CAPACITY OF A CALCULATOR

Filed April 29, 1965

4 Sheets-Sheet 2

INVENTOR

BY: Paul Thevis

Michael S. Striker

ATTORNEY

INVENTOR
Paul Thevis
BY: Michael S. Striker
ATTORNEY

Oct. 10, 1967

P. THEVIS 3,346,179

APPARATUS FOR PREVENTING CALCULATIONS WITH NUMERICAL VALUES HAVING A NUMBER OF ORDERS GREATER THAN THE CAPACITY OF A CALCULATOR

Filed April 29, 1965

4 Sheets-Sheet 4

INVENTOR
Paul Thevis
BY: Michael S. Striker
ATTORNEY 3,346,179

APPARATUS FOR PREVENTING CALCULATIONS WITH NUMERICAL VALUES HAVING A NUMBER OF ORDERS GREATER THAN THE CAPACITY OF A CALCULATOR

Paul Thevis, Oberndorf, Germany, assignor to Olympia Werke AG, Wilhelmshaven, Germany Filed Apr. 29, 1965, Ser. No. 452,029
Claims priority, application Germany, Oct. 24, 1964, O 10,466
14 Claims. (Cl. 235—60)

ABSTRACT OF THE DISCLOSURE

A pin carriage is sensed by first sensing means while second sensing means sense the storing elements of a multiplier register. Both sensing means control a locking device for preventing a multiplication of the numerical values registered in the pin carriage and in the multiplier register, if the number of orders of the result value would exceed the capacity of the calculator.

*Background of the invention*

The number of order elements of the storing means of a calculator, for example of the pin carriage, or of the registers of the calculator, and thereby the capacity of the calculator, is limited so that the calculator can still be economically manufactured, and is of compact construction, while permitting those calculations for which calculators of this type are intended.

However, if the capacity of a calculator is exceeded, and an attempt is made to enter into a storing means a numerical value having a greater number of order than the number of orders for which the storing means or register is designed, wrong results are obtained. For example, a multiplication may be carried out with a multiplicand and a multiplier which has a result with so many orders that the capacity of the result register, in other words the number of order elements of the result register, is insufficient for storing the result so that a wrong result is stored, indicated, and used for further calculations.

Calculators are known which carry out such wrong calculations, and then indicate by an acoustic or visual signal that the operation was wrong, and should be corrected. Other known calculators print a special mark next to the wrong result.

These solutions of the problem are not completely satisfactory, since a wrong calculation is actually carried out, while the signal or mark may not be recognized, or disregarded so that the wrong result stands.

*Summary of the invention*

It is one object of the invention to overcome the disadvantages of the means provided in known calculators for preventing the exceeding of the capacity of the calculator, and to provide apparatus which under all operation conditions prevents the carrying out of a calculating operation if the capacity of the calculator is exceeded.

Another object of the invention is to provide apparatus for preventing a calculator to carry out a multiplication whose result would have a number of orders exceeding the number of order elements provided in the result storage means of the calculator.

Another object of the invention is to prevent the entry of a numerical value into an input storage means, such as a pin carriage, if such numerical value exceeds the number of order elements provided in the pin carriage for this purpose.

Another object of the invention is to prevent the entering of a numerical value, such as a multiplier, into a storing means, such as the register, if the multiplier has a number of orders exceeding a predetermined number of order elements provided in the storing means for this purpose.

Another object of the invention is to prevent a multiplication operation of the calculator, if the order number of a multiplicand and of a multiplier, entered in respective storing means, indicates that the number of orders of the result will exceed the number of order elements provided for this purpose in the result storage means.

Another object of the invention is to lock a function key, for example the multiplication key, if calculations initiated by the respective key will exceed the capacity of the calculator, for example the number of order elements of the result register.

However, it is also an object of the invention to lock the multiplication key if the number of the orders of an entered multiplier or multiplicand exceeds the number of order elements provided in the respective storing means for the multiplicand and multiplier.

With these objects in view, the present invention relates to an apparatus for preventing operations of a calculator with numerical values having a number of orders greater than the capacity of the calculator. One embodiment of the invention comprises operating means for effecting a calculating operation, for example a multiplication with two numerical values; first storing means, for example a pin carriage, having a plurality of ordinal storing elements, such as a row of pins, operable between a position of rest and a storing position for storing the orders of a first numerical value, for example the multiplicand; first sensing means for sensing the number of first ordinal storing elements in the storing positions, or the corresponding displaced position of the pin carriage; second storing means, such as a register, having a plurality of second ordinal storing elements operable between a position of rest and storing positions for storing the orders of a second numerical value, for example of the multiplier; second sensing means for sensing the number of second ordinal storing elements in said storing positions; and a locking device for locking the operating means, preferably by locking the multiplication key by which the multiplication is started.

The locking device is controlled by the first and second sensing means to lock the operating means when at least one of the first and second storing means has a number of storing elements in the storing positions, which exceeds a selected number of orders.

A third storing means, such as a result register, having a selected limited number of third ordinal storing elements for storing the orders of the result of the calculating operation is provided. The first and second sensing means control the locking means to lock the multiplication key when the number of the storing elements of the first and second storing means in said storing positions, determines a number of orders of the result exceeding the limited selected number of third ordinal storing elements.

In accordance with the present invention, the multiplication key is locked, when a comparison of the number of storing elements storing the orders of the multiplicand with the number of storing elements storing the orders of the multiplier indicates that the result of the multiplication will have a number of orders exceeding the number of order elements provided for storing the result. However, the multiplication key is also locked if the number of orders of the multiplier, or of the multiplicand, exceeds a predetermined number of orders. It is advantageous to also lock the multiplication key if no numerical value is entered in the storage means of the multiplicand, in other words if the pin carriage does not perform a single step.

The calculator is designed so that the number of storing elements of the storing means for the multiplier is greater than the maximum number of orders of the multiplier for which the machine is designed. The number of order elements of the pin carriage is greater than the maximum number of orders of a multiplicand to be entered in the pin carriage. Evidently, the number of orders of the result storage means must be greater than the maximum number of orders of the multiplier or multiplicand, but is smaller than the maximum possible number of orders for storing a result of a multiplication of a multiplicand by a multiplier, each of which has the maximum numbers of orders for which the respective storing means of the calculator are designed.

It is preferred to provide a result storing means having a number of orders which is less than twice the number of orders of either the multiplicand or the multiplier.

By way of example, in the preferred embodiment of the invention, the input carriage has eleven order elements, of which ten order elements are used for storing a multiplicand. The storing register in which the multiplier is stored, has actually fifteen order elements since it is also used as a storage means of values during other calculating operations. Only ten order elements of this register are used for storing the multiplier so that the number of orders of the multiplier cannot exceed ten.

The result storage register has fifteen order elements of which only fourteen are used for storing the result of the multiplication. This means, that for a multiplier having ten, nine, eight, etc. orders, the multiplicand must not have more than four, five, six, and so forth orders, and vice versa. Evidently, the number of order elements of the various storing devices can be selected in accordance with the purposes for which the capacity of the calculator is to be designed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
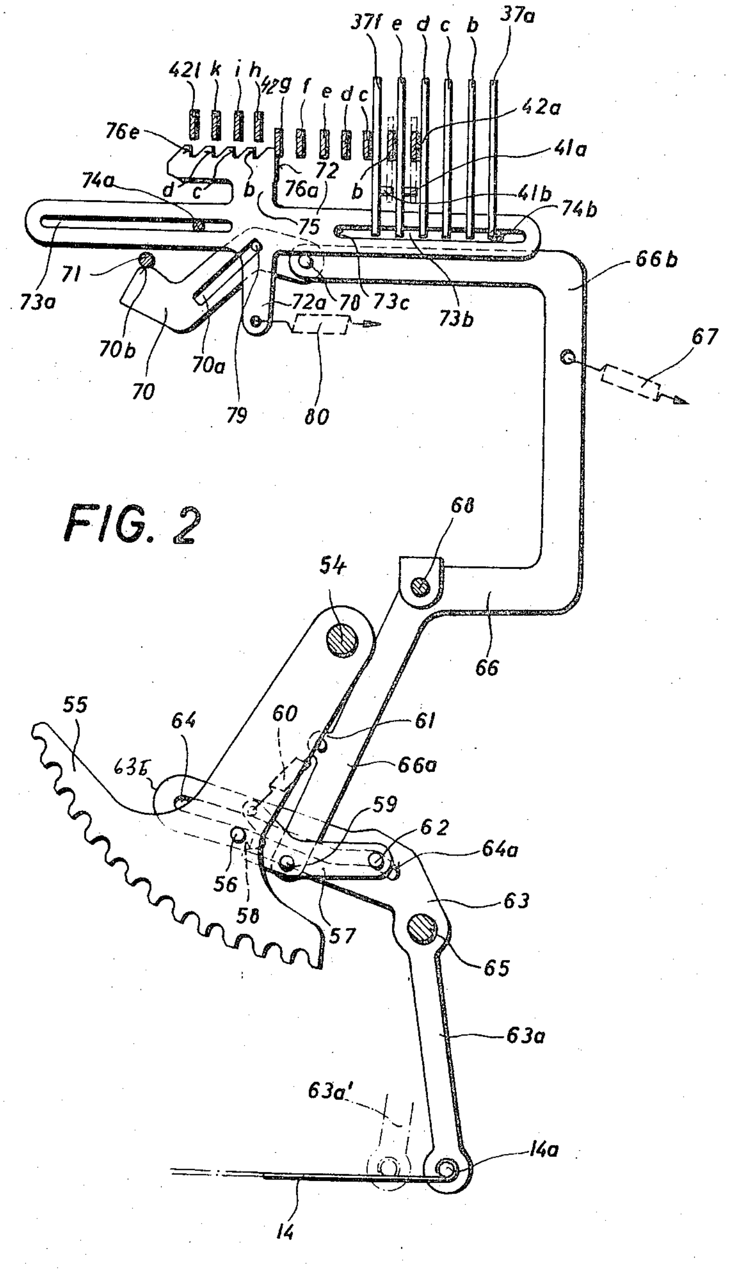
FIG. 2 is a fragmentary plan view illustrating apparatus according to the embodiment of FIG. 1 in a first operational position for preventing the carrying out of a multiplication with a multiplier having a number of orders exceeding the capacity of the calculator.
Figure 3:
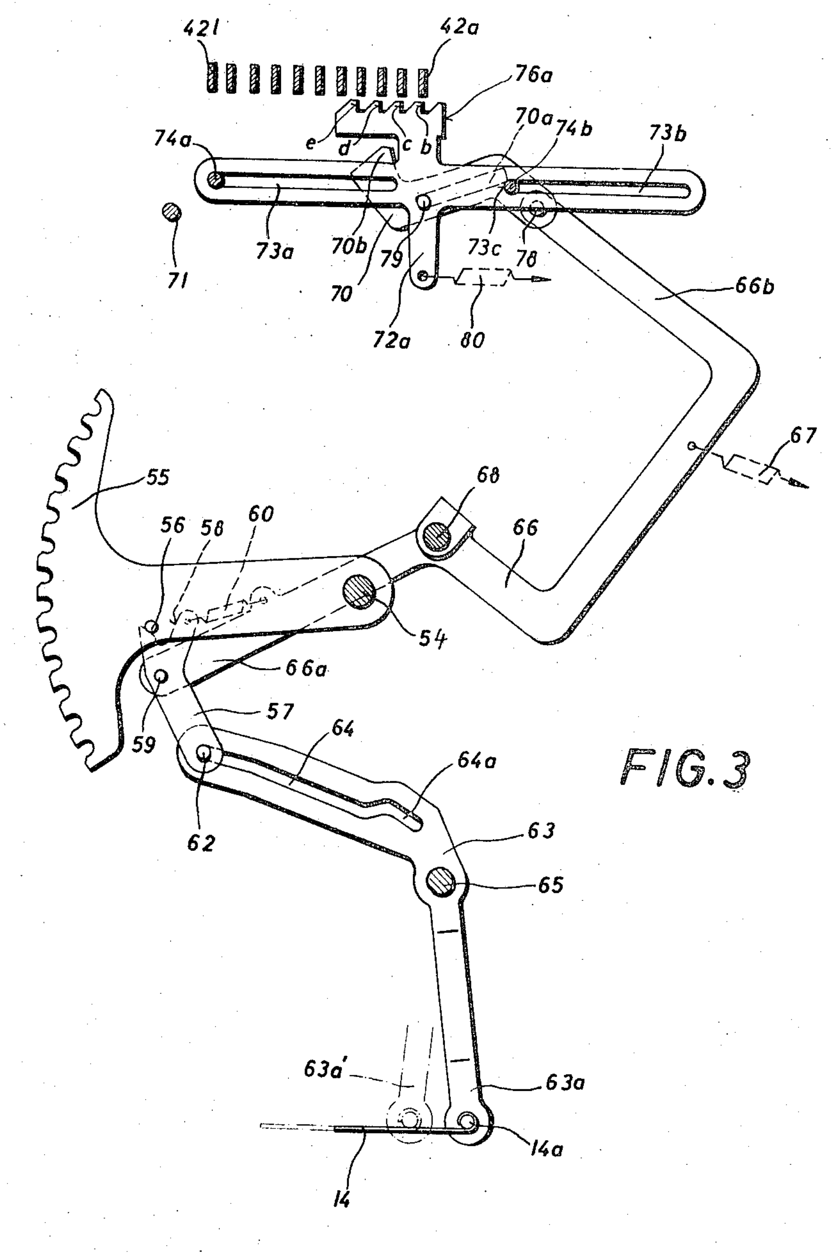
Figure 4:
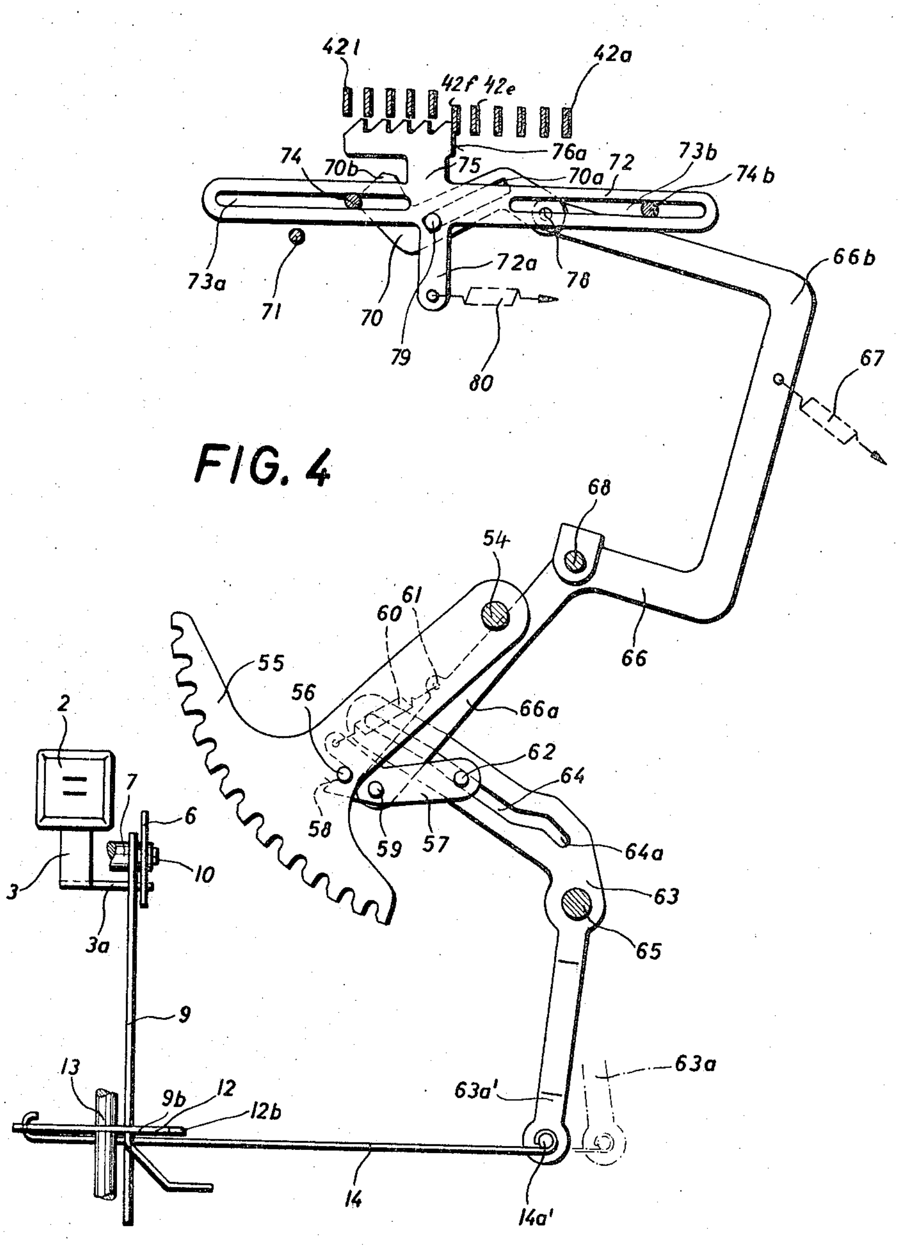

FIG. 3 is a plan view corresponding to FIG. 2, but illustrating another operational position for preventing a multiplication if the number of orders of the multiplicand exceeds the capacity of the calculator; and FIG. 4 is a plan view corresponding to FIGS. 2 and 3 and illustrating a third operational position in which the numbers of the orders of the multiplicand and multiplier permit a multiplication.

Figure 1:
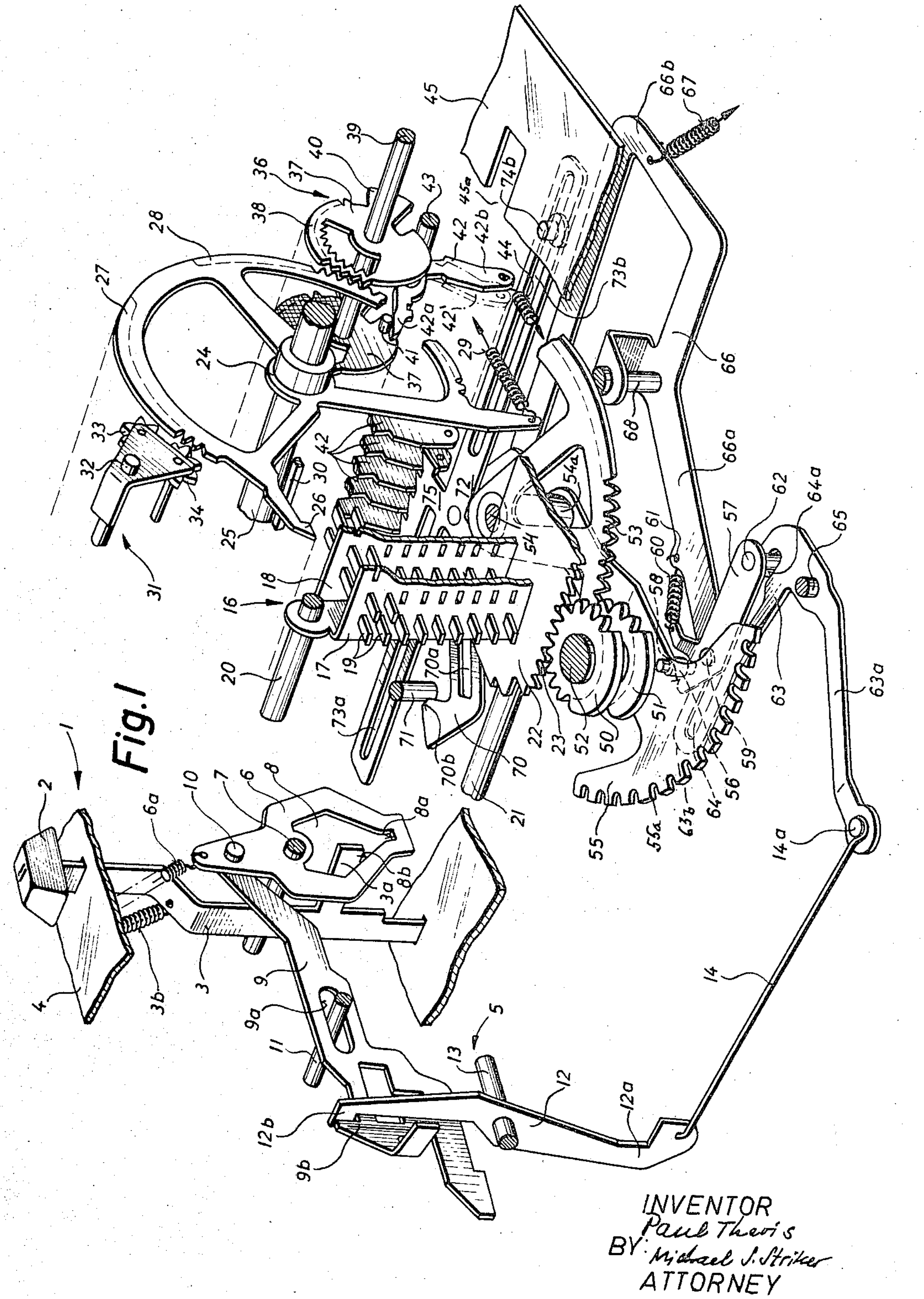
FIG. 1 is a fragmentary perspective view illustrating one embodiment of the invention as applied to a ten-key calculator.

Referring now to the drawings, and more particularly to FIG. 1, a multiplication key 2 has a stem 3 provided with a transverse locking projection 3*a*. A spring 3*b* connects the stem of key 2 with the cover plate 4 to hold the key in the normal inoperative raised position. A locking member 6 is mounted on a shaft 7 for turning movement and has a substantially heart-shaped cut-out 8 with a narrow notch 8*a* at the lower end, and with a slanted guide edge 8*b*. A spring 6*a* biases locking member 6 to turn in counterclockwise direction, so that locking projection 3*a* abuts the slanted edge 8*b*. A lever 9 has a slot 9*a* receiving a stationary shaft 11 so that lever 9 is mounted for translatory and turning movement. The free end of lever 9 carries a pivot pin 10 connected with locking member 6. The other end of lever 9 has a projection 9*b* engaged in the illustrated position by a projection 12*b* of a double-armed lever 12 which is mounted on a shaft 13. The other end 12*a* of lever 12 is connected by stiff wire 14 to a pivot means 14*a* on the arm 63*a* of an angular lever 63 which is mounted on a pivot means 65 for turning movement and which has an arm 63*b*, best seen in FIG. 3, formed with an elongated cam slot 64 which has an offset end portion 64*a*.

As long as locking projections 12*b* and 9*b* engage each other, key 2 cannot be depressed since the locked lever 9 prevents turning of locking member 6 so that the slanted edge 8*b* blocks locking portion 3*a*. However, if locking lever 63 is turned in clockwise direction to the position 63*a'*, as shown in FIGS. 2, 3 and 4, blocking lever 12 is turned in clockwise direction as viewed in FIG. 1 and releases projection 9*b* so that pressure exerted on key 2 will turn locking member 6 about shaft 7 while the released lever 9 performs a translatory movement permitted by slot 9*a*. Finally, key 2 will be stopped in a depressed position when projection 3*a* abuts the bottom of notch 8*a*. Upon release of key 2, springs 3*b* and 6*a* restore the initial position of the above-described locking means 5.

It will be understood that key 2 is part of well-known operating means which will effect a multiplication operation of the calculator when key 2 is depressed. Such a multiplication operation is prevented as long as key 2 is locked in the illustrated inoperative position by locking means 5. The operating means for carrying out the multiplication, or other calculating operations, are, for example, described in the U.S. Patent 2,667,307, and other U.S. patents issued to Westinger et al., for example the U.S. Patent 2,665,844 which discloses calculator parts shown in the right hand portion of FIG. 1.

The calculator illustrated in FIG. 1 has at least one input storing means, shown to be a pin carriage 16, in which the multiplicand is stored, a storing means for the multiplier, shown as a register 36, and a storing means for the result, which is a register 31.

Pin carriage 16 has a front wall 17, a rear wall 18, and ordinal rows of storing pins 19 which are guided in slots of walls 17, 18 for movement between inoperative and storing positions. When a numerical value is entered into the input carriage 16 in a well known manner, one pin 19 of each row is displaced to indicate a digit in their respective order. After storing a digit in each order, the pin carriage performs a step to place the next ordinal row of pins 19 in the input position. During such stepwise movement, pin carriage 16 is guided along guide rails 20 and 21. The rows of pins 19 may be considered as ordinal storing elements, and the number of storing elements in storing position corresponds to the number of orders of a numerical value, for example of a multiplicand, entered into storing means 16, and such number of entered orders will be represented by the displaced position of the pin carriage.

Walls 17 and 18 are fixed to a horizontal plate 22 provided with gear teeth 23 meshing with a gear 50 secured to a shaft 52 carrying another gear 51 meshing with a gear sector 53 which is connected by hub 54*a* with a member 55 having a segment shaped gear portion 55*a*, and an arm 55*b* to which hub 54*a* is secured. Hub 54*a*, and thereby members 53 and 55 is mounted for turning movement on a stationary shaft 54. When the pin carriage 16 is stepwise displaced for each digit stored in one of its order elements, the stepwise motion is transferred by gears 23, 50, 51, 53 to member 55 and to a coupling pin 56 which is fixedly secured to member 55. Consequently, coupling pin 56 will perform a stepwise movement along a circular path whose center is located in the axis of shaft 54, and the displaced positions of coupling pin 56 will represent the number of orders of pin carriage 16 in which digits were entered. Consequently, members 23, 50, 51, 53, 55, and 56 constitute sensing means for sensing the number of ordinal storing elements of pin carriage 16 which are in storing positions.

Pins 19 in storing positions are sensed by an ordinal set of transfer members 24, of which only one is shown in FIG. 1. One transfer member 24 is provided for each order of the pin carriage 16, and all transfer members 24 are mounted for independent turning movement on a shaft 25, and are urged by springs 29, respectively, to a position of rest in which a projecting arm 26 abuts a common stop member 30 extending parallel to shaft 25. When stop member 30 is lowered at the beginning of an operational cycle, springs 29 will urge transfer member 24 to turn in counterclockwise direction to a position abutting pins 19 of the corresponding order in storing position so that the angular displacement of transfer members 24 represents the digits in their respective order. First and second gear portions 27 and 28 are provided on the periphery of each transfer member 24. The result storing means 31 are mounted on a shaft 32, and can be turned between two positions in which either gear 33 or gear 34 meshes with gear portion 27 to store a value transferred by transfer members 24 from pin carriage 16 in a positive or negative sense. Another storing means, shown to be a multiplication register 36 has a set of ordinal gears 38 meshing with gear portions 28, respectively, of transfer members 24 in an operative position of the multiplication register 36. Gears 37 are mounted on a shaft 39, and can be shifted with the same to an inoperative position spaced from the transfer members. Each ordinal gear 37 has a gear portion 38 meshing with gear portion 28 of the respective transfer member 24, and a projecting portion 40.

During the first half of an operational cycle of the calculator, stop member 30 releases the transfer members 24, and the stored value is transferred to the transfer members 24. During the second half of the operational cycle, the respective storing means is moved to a position in which gears 33, or 34, and 37 mesh with the gears of the transfer members.

In the calculator which is partly shown in FIG. 1, and disclosed in the above referred to Westinger et al. patents, numerical values can be transferred in any sequence between the result storing register 31 and the multiplier storing register 36. A numerical value which is to be used as a multiplier can be transferred over transfer members 24 into multiplier storing register 36 from another storing means, or from pin carriage 16. On the other hand, the multiplier storing register 36 is also used as a storing means for storing other values used for other calculating operations not related to a multiplication.

The projections 40 of the ordinal register gears 37 of storing means 36 serve as abutments for successively stopping in the ascending order sequence a multiplication slide, not shown. In the ordinal positions of the multiplication slide, the digital value stored in each register gear 37 is transferred into a counter register and used for repeated additive operations constituting a multiplication.

When multiplication key 2 is depressed, the escapement mechanism of pin carriage 16 is released, and pin carriage 16 is coupled with the multiplication slide in a manner which is not an object of the invention. The gear segment of member 55 is used for this purpose. The multiplication slide controls the multiplication in such a manner that the multiplicand stored in pin carriage 16 is added in each order as often as required by the digit stored in their respective order of the multiplier storing means 36. After each order has been multiplied and entered in the corresponding order of the result storing means, the multiplication slide moves to the next following ordinal position where it is stopped by the respective projection 40. The result is entered in the result storing means 31.

A calculator to which the present invention is advantageously applied, has a multiplier storing means 36 which has a greater number of ordinal storing gears 37 than the maximum number of orders of a multiplier to be used for a multiplication. The number of ordinal rows of pins of pin carriage 16 is greater than the maximum number of order of a multiplicand which is to be used, and the number of ordinal storing elements of the result storing means 31 is greater by several orders than the maximum number of orders of either the multiplicand or the multiplier.

In the illustrated embodiment of the invention, the pin carriage 16 has clever ordinal elements, of which ten are to be used for storing the multiplicand. The multiplication storing means 36 has fifteen ordinal elements 37 of which only the ten lowest ordinal elements are to be used for storing the multiplier. All fifteen ordinal elements of storing means 36 are only used when the same stores a numerical value used for calculations different from a multiplication. The result storing device 31 has fifteen ordinal storing elements of which the storing elements of the highest order is not to be used for storing the result of a multiplication. Consequently, the result of a multiplication carried out by the calculator illustrated in the drawing must not have more than fourteen orders. Ten orders of pin carriage 16 and of register 36 are used in the disclosed embodiment since pin carriage 16 and register 36 are designed to move not more than ten steps together in coupled condition during a multiplication. An eleventh step is carried out only if a so-called shortened multiplication is to be carried out in the tenth order.

Consequently, the operating means of the calculator, and more particularly the multiplication key 2, must be locked if either the multiplicand or the multiplier has more than ten orders. If either the multiplicand or the multiplier has ten orders, the respective other value must have no more than four orders so that the fourteen orders of the result storing means are not exceeded, and if the respective other value has more than four orders, key 2 must be locked. If the multiplicand has ten, nine, eight, and so forth orders, the multiplier must have four, five, six and so forth orders, and vice versa so that the sum of the order numbers of the multiplicand and multiplier does not exceed fourteen, which is the number of ordinal storing elements in the result storing means, and if the sum exceeds fourteen, key 2 must be locked. Since only ten order elements of pin carriage 16 can be used for a multiplication, it is not necessary to lock key 2 if the multiplier has less than five orders, that is between one and four orders.

Referring again to the drawings, and more particularly to FIG. 2, six storing gear elements 37*a* to 37*f* are illustrated, but actually register 36 has fifteen ordinal gears 37. The fifth ordinal gear element 37*e*, and all following ordinal gear elements of the higher orders, have a transversely projecting pin 41, see FIG. 1, of which only pin 41*a* and 41*b* of ordinal storing gears 37*e* and 37*f* are shown in FIG. 2.

An ordinal set of angular levers 42 are mounted on a shaft 43 and are respectively urged by springs 44 to turn in clockwise direction as viewed in FIG. 1 to a position in which the end portion 42*a* abuts pin 41 of the respective ordinal gear 37. If the respective ordinal gear 37 is in a position of rest, the respective lever 42 is in the position illustrated in solid lines in FIG. 1, but when the respective ordinal gear 37 is turned to a storing position, the respective lever 42 is displaced to a position 42' shown in broken lines in FIG. 1, and for levers 42*a* to 42*g* in FIG. 2. In the position of FIG. 2, it is assumed that digital values are stored in the first eleven orders of register 36 to be used as a multiplier. However, as explained above, no multiplier having a number of orders greater than ten is to be used, and consequently in the operational condition of FIG. 2, locking of key 2 is required.

A sensing slide 72 has a pair of aligned slots 73*a* and 73*b* in which guide pins 74*a* and 74*b* are located to guide sensing slide 72 parallel to the axis of register 36. Guide pins 74*a* and 74*b* are secured to the cover plate 45 which has a cut-out 45*b* through which all levers 42 project. Sensing slide 72 has a portion 75 provided with a rack portion with five abutments 76*a*, 76*b*, 76*c*, 76*d*, and 76*e*. Levers 42 in positions 42′ indicating a value stored in the respective order, are located in the path of movement of abutment 76*a* of slide 72. A spring 80 is connected to slide 72 and urges the same to move to the right as viewed in the drawing until abutment 76*a* abuts the lever 42 of the highest order in which a value is stored due to the fact that the respective lever has been moved to position 42′.

It will be seen that levers 42 sense whether an ordinal storing element stores a value, and that sensing slide 72 senses which is the highest order storing a value.

A pin 79 is secured to slide 72 and projects into a slot 70*a* of an S-shaped member 70 which is connected by a pivot pin 78 to the portion 66*b* of a lever means 66 which is mounted on a stationary pin 68 for turning movement, and is urged by spring 67 to turn in clockwise direction. S-shaped member 70 abuts an abutment pin 71 in the position illustrated in FIG. 2 where sensing slide 72 senses a value stored in the eleventh order of register 36. In this position, lever means 66 is blocked, and spring 67 cannot turn lever means 66. If sensing slide 72 senses that the tenth order of the register 36 is the highest order in which a value is stored, as indicated by the position of sensing lever 42*f*, S-shaped member 70 no longer abuts abutment pin 71, and spring 67 turns lever means 66 until pin 79 is located at the end of slot 70*a*. In this position, the abutment face 70*b* of member 70 no longer abuts abutment pin 71.

Arm 66*a* of lever means 66 carries a pivot pin 59 on which a coupling member 57 is mounted for angular movement. Coupling member 57 has a coupling recess 58 cooperating with coupling pin 56 on member 55. A spring 60 is connected to a pin 61 on lever portion 66*a* and to a projecting arm of coupling member 57 and urges the latter to turn in clockwise direction. Coupling member 57 carries a guide pin 62 located in cam slot 64 of angular lever 63 which forms part of the locking means 5 for multiplication key 2.

*Operation*

It is assumed that a multiplier has been entered in the multiplier register 36. Pin carriage 16 has returned to its home position, and during such movement to the left as viewed in the drawing, the slanted faces of abutments 76*a* to 76*e* have momentarily turned sensing levers 42 in positions 42′ indicating a stored digit in the respective order in counterclockwise direction as viewed in FIG. 1, but after the abutments have passed all coupling levers 42, the coupling levers are turned back to position 42′ by springs 44.

All other parts, except the multiplication register 36, are in the normal position of rest. Assuming that values have been entered in the first eleven ordinal storing elements of register 36, as shown in FIG. 2 by the displaced position of sensing levers 42*a* to 42*g*, abutment 76*a* abuts sensing lever 42*g* in the respective position 42′ so that slide 72 cannot move to the right out of the position shown in FIG. 2 under the action of spring 80. Spring 67 is also ineffective to turn lever means 66 since member 70 abuts abutment pin 71. The turning movement of sensing levers 42 is limited in the position 42′ by abutment of the same on the forward edge of cutout 45*a* in cover plate 45.

In the initial position, coupling pin 56 is located in coupling recess 58. Lever 63 and the other elements of the locking device 5 are in the locking position, and key 2 is locked and cannot be depressed. It is assumed that the operator enters a digit in the lowest order of the pin carriage 16 so that the same performs a step to a displaced position causing a corresponding angular displacement of member 55 so that coupling pin 56 moves to the position of FIG. 2 located outside of coupling recess 58. Spring 60 urges coupling member 57 to turn in clockwise direction and since guide pin 62 is located in the slot end portion 64*a*, locking lever 63 is urged to turn in counterclockwise direction, but cannot move since key 2 is already locked in the position of locking lever 63 shown in FIG. 2. Therefore, it is not possible to perform a multiplication with any value entered as multiplicand in pin carriage 16, as long as eleven orders or a multiplier are stored in multiplier register 36, and the sensing levers 42 of the first eleven orders are in the position 42′. The disclosed embodiment is designed to prevent multiplication with multipliers having more than ten orders.

FIG. 3 illustrates an operational condition in which the multiplier entered in multiplier register 36 has less than 5 orders. Since the ordinal storing elements 37*a* to 37*d* have no sensing levers 42, as is apparent from FIG. 2, no values are entered into the higher orders of the multiplier register, and consequently all sensing levers 42*a* to 42*l* are in the normal position shown in solid lines in FIG. 1 abutting pin 41 of the respective ordinal storing element 37 which is in the position of rest. Consequently, spring 80 has pulled sensing slide 70 to an end position, and abutment 76*a* has passed all inoperative sensing levers 42.

When a multiplicand has been entered into the pin carriage 16, sensing means 23, 50, 51, 53, and 55 assume a corresponding position representing the number of orders of the multiplicand entered in the pin carriage. Lever means 66 is no longer blocked, and can be turned by spring 67. Abutment face 70*b* moves away from abutment pin 71, and member 70 turns while being pulled by lever means 66. When pin 79 abuts the end of slot 70*a*, slide 72 is moved to the right until guide pin 74*b* abuts the end portion 73*c* of slot 73*b*. As explained above, this movement of sensing slide 72 is not blocked by the sensing levers 42 since they are all in the normal position of rest, no value being stored in multiplier register 36 in their orders above the fourth order.

The initial position of pin 47*b* in relation to the end face 73*c* of slot 73*b* corresponds to the spacing of seven ordinal elements, and the length of slot 70*a* in member 70 corresponds to the spacing of three ordinal elements of register 36.

While lever means 66 turns an angle corresponding to ten ordinal steps, pin 62 of coupling member 57 slides in the main portion of cam slot 64. The force of spring 67 acts through lever arm 66*a*, pivot pin 59, guide pin 62 on arm 63*b* of locking lever 63 and turns the same in clockwise direction to the position 63*a*′ illustrated in broken lines in FIG. 3. Wire 14 is moved to the left and turns locking lever 12 in clockwise direction so that locking member 9 is released and spring 6*a* turns locking member 6 to a position permitting depression of multiplication key 2 to start the multiplication operation. As explained above, the disclosed embodiment of the calculator is designed to permit multiplication operations in which the multiplier has four or less orders, and the multiplicand has not more than ten orders.

While ten orders were entered into the pin carriage, coupling pin 56 was located in recess 58 of coupling member 57, preventing turning of the same by spring 60 in clockwise direction, and corresponding turning of locking lever 63 in counterclockwise direction to the locking position. This position is not illustrated in FIG. 3. Pin 62 moves in slot 64 during each step of the pin carriage and of sensing member 55, and when after the tenth step of the pin carriage, pin 62 is located at the end of slot 62, coupling member 57 can no longer follow coupling pin 56 of sensing member 55.

Therefore, when a digit is entered into the eleventh ordinal storing element of the pin carriage, and the same performs an eleventh step, which would correspond to the use of a multiplicand having more than ten orders, which is not desired, sensing member 55 moves an eleventh step, and since coupling member 57 cannot follow since pin 62 is located at the end of slot 64, coupling pin 56 moves out of coupling recess 58 to the position illustrated in FIG. 3. Coupling member 57 is no longer blocked by coupling pin 56, and spring 60 turns coupling member 57 in clockwise direction so that pin 62 acts on lever arm 63b to turn locking lever 63, which up to the tenth order was in the releasing position 63a', back to the locking position shown in solid lines in FIG. 3. From the exemplary position illustrated in FIG. 3, it will become apparent that if the multiplier has from one to four orders, a multiplicand from one to ten orders can be used, but a multiplicand having more than ten orders cannot be used since the multiplication operation cannot be started by the locked key 2. Consequently, under no circumstances a result having more than fourteen orders, for which the result register is designed, can be obtained.

FIG. 4 illustrates another operational condition of the apparatus in which the multiplier has ten orders. In this event, the multiplicand is limited to no more than four orders. Since a numerical value is stored in the first ten ordinal storing elements of the multiplier register 36, the sensing levers 42a to 42f of the sixth to tenth orders are in the actuated position 42' indicating that the respective ordinal storing elements 37 are in storing positions. When slide 72 is released, it will be blocked when abutment 76a abuts sensing lever 42f of the tenth order in actuated position.

When a value is entered into the first order of pin carriage 16, the same performs a first step. Sensing member 55 moves a corresponding step and coupling member 57 follows sensing member 55 so that pin 62 moves into the main portion of slot 64. Spring 67 turns lever means 66 so that member 70 slides off abutment pin 74. While pin carriage 16 and sensing member 55 perform four steps corresponding to the first four orders of the multiplicand, which are permissible since the multiplier has ten orders, spring 67 turns lever means 66 while pin 79 moves in the slot of member 70. When pin 79 is at the end of slot 70a, and abutment 76a abuts sensing lever 42f, lever means 66 can turn no further. During the first step of sensing member 55 and the first step of the pin carriage, abutment 76a has moved with slide 72 to a position abutting sensing lever 42f so that lever 70 could slide off abutment pin 71. An angular turning movement of lever means 66 corresponding to three spaces between the ordinal elements of register 36 are possible due to the corresponding length of slot 70a. Between the first and the fourth displaced positions of lever means 66, locking lever 63 is in the releasing position 63a', key 2 is unlocked, and a multiplication operation can be started since four orders of the multiplicand are permissible when the multiplier has ten orders. A position corresponding to four orders of the multiplicand is illustrated in FIG. 4. If a digit is entered into the fifth ordinal storing element of the pin carriage 16, sensing member 55 turns another step and coupling pin 56 moves out of coupling recess 58, permitting spring 60 to turn coupling member 57 in clockwise direction so that pin 62 turns locking lever 63 in counterclockwise direction and moves the same from releasing position 63a' to the locking position 63a in which key 2 is locked so that no multiplication can be carried out with a multiplicand having five orders after a multiplier having ten orders was stored in the multiplier register 36.

Assuming, however, that the multiplier has only nine orders, so that sensing lever 42f is in its position of rest, then abutment 76a will move with sensing slide 72 one step farther to the right and abutment 76a will abut sensing lever 42e of the ninth order. Lever means 66 will be turned farther before pin 79 is located at the end of slot 70a, and coupling member 57 will be able to follow sensing member 55 another step while coupling pin 56 remains in coupling recess 58 and pin 62 moves one step farther in slot 64. Consequently, a multiplicand having five orders can be used with a multiplier having nine orders. In the same manner, a multiplicand having six orders can be used with a multiplier having eight orders, the sum of the orders of the multiplier and multiplicand remaining 14, corresponding to the number of orders for which the result register is designed. When transfer lever 66 is blocked due to the abutment of abutment 76a on the sensing lever 42e of the ninth order, for example, and a digit is entered into the sixth order of the pin carriage 16 so that sensing member 55 performs another step, pin 56 moves out of recess 58, and spring 60 is effective to turn coupling member 57 so that locking lever 63 is turned from the releasing position 63a' to the locking position 63a.

Sensing means 42, 75, 72, 70, 66 which sense the number of ordinal storing elements 37 of register 36, and sensing means 23, 50, 51, 53, 55 which sense the number of storing elements of pin carriage 16 which are in storing positions, both act on coupling means 56, 57, 58, 60 which are connected to locking member 63 of the locking means 5 to effect the locking of key 2 by which the multiplication is started, if either the pin carriage 16 or the register 36 stores digits in more than ten ordinal storing elements, and also when pin carriage 16 and multiplier register 36 store a multiplicand and a multiplier, respectively, having so many orders that the result would exceed fourteen orders.

Lever means 66 with coupling member 57 can follow the movement of sensing member 55 during entry of the multiplicand into the pin carriage, until sensing slide 72 is blocked by the sensing lever 42 of the highest order of register 36 in which an order of the multiplier is stored. As long as the pin carriage moves a number of steps corresponding to a permissible number of orders of the multiplicand, key 2 is free, but when digits entered into the pin carriage would cause a result having more than fourteen orders, coupling pin 56 releases coupling member 57, and key 2 is again locked.

Since lever means 66 is connected by lost-motion means 70, 70a, 79, 74b, 73b to sensing member 72 and supports coupling member 57 which is connected by lost-motion means 62, 64 with locking member 63, sensing members 72 and 55 can move independently of each other.

While the invention has been illustrated and described as embodied in an apparatus for preventing multiplications with a multiplier and multiplicand having order numbers, or producing a result having order numbers greater than the capacity of the calculator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a calculator, in combination, apparatus for preventing operations with numerical values having a number of orders greater than the capacity of the calculator, comprising, operating means for effecting with two numerical values a calculating operation having a result; first storing means having a plurality of ordinal storing elements operable between a position of rest and storing positions for storing the orders of a first numerical value; first sensing means for sensing the number of first ordinal storing elements in said storing positions; second storing means having a plurality of second ordinal storing elements operable between a position of rest and storing positions for storing the orders of a second numerical value; second sensing means for sensing the number of second ordinal storing elements in said storing positions; third storing means having a selected number of third ordinal storing elements for storing the orders of the result of said calculating operation; and a locking device for locking said operating means, and being controlled by said first and second sensing means to lock said operating means when the number of said storing elements of at least one of said first and second storing means in said storing positions, corresponding to the number of orders of a numerical value stored therein, exceeds a selected number of orders, and when the number of said storing elements of said first and second storing means in said storing positions determines a number of orders of the result of said calculating operation exceeding said selected number of third ordinal storing elements.

2. In a calculator, in combination, apparatus for preventing operations with numerical values having a number of orders greater than the capacity of the calculator, comprising, operating means for effecting with two numerical values a calculating operation having a result; first storing means having a plurality of ordinal storing elements operable between a position of rest and storing positions for storing the orders of a first numerical value; first sensing means for sensing the number of first ordinal storing elements in said storing positions; second storing means having a plurality of second ordinal storing elements operable between a position of rest and storing positions for storing the orders of a second numerical value; second sensing means for sensing the number of second ordinal storing elements in said storing positions; third storing means having a selected number of third ordinal storing elements for storing the orders of the result of said calculating operation; and a locking device for locking said operating means, and being controlled by said first and second sensing means to lock said operating means when the number of said storing elements of said first and second storing means in said storing positions determines a number of orders of the result of said calculating operation exceeding said limited number of third ordinal storing elements.

3. In a calculator, in combination, apparatus for preventing operations with numerical values having a number of orders greater than the capacity of the calculator, comprising, operating means for effecting with two numercial values a calculating operation having a result; first storing means having a plurality of ordinal storing elements operable between a position of rest and storing positions for storing the orders of a first numerical value; first sensing means for sensing the number of first ordinal storing elements in said storing positions; second storing means having a plurality of second ordinal storing elements operable between a position of rest and storing positions for storing the orders of a second numerical value; second sensing means for sensing the number of second ordinal storing elements in said storing positions; third storing means having a selected number of third ordinal storing elements for storing the orders of the result of said calculating operation; and a locking device including locking means having an inoperative position and a locking position for locking said operating means, and coupling means connecting said first and second sensing means with said locking means and having a member controlled by said first and second sensing means to move said locking means to said locking position when the number of said storing elements of at least one of said first and second storing means in said storing positions, corresponding to the number of orders of a numerical value stored therein, exceeds a selected number of orders, and when the number of said storing elements of said first and second storing means in said storing positions determines a number of orders of the result of said calculating operation exceeding said selected number of third ordinal storing elements.

4. In a calculator, in combination, apparatus for preventing operations with numerical values having a number of orders greater than the capacity of the calculator, comprising, operating means for effecting with two numerical values a calculating operation having a result; first storing means having a plurality of ordinal storing elements operable between a position of rest and storing positions for storing the orders of a first numerical value, said first storing means including a pin carriage and means for displacing said pin carriage one step for each storing element which is in a storing position so that the displaced positions of said pin carriage represent the number of orders of the value stored therein; first sensing means for sensing the displaced portions of said pin carriage and thereby the number of first ordinal storing elements in said storing positions; second storing means having a plurality of second ordinal storing elements operable between a position of rest and storing positions for storing the orders of a second numerical value; second sensing means for sensing the number of second ordinal storing elements in said storing positions; third storing means having a selected number of third ordinal storing elements for storing the orders of the result of said calculating operation; and a locking device including locking means having an inoperative position and a locking position for locking said operating means, and coupling means connecting said first and second sensing means with said locking means and having a member controlled by said first and second sensing means to move said locking means to said locking position when the number of said storing elements of at least one of said first and second storing means in said storing positions, corresponding to the number of orders of a numerical value stored therein, exceeds a selected number of orders, and when the number of said storing elements of said first and second storing means in said storing positions and the displaced position of said pin carriage determines a number of orders of the result of said calculating operation exceeding said selected number of third ordinal storing elements.

5. In a calculator, in combination, apparatus for preventing operations with numerical values having a number of orders greater than the capacity of the calculator, comprising, operating key means for effecting with a multiplication with a multiplicand and a multiplier having a result; first storing means having a plurality of ordinal storing elements operable between a position of rest and storing positions for storing the orders of the multiplicand, said first storing means including a pin carriage and means for displacing said pin carriage one step for each storing element which is in a storing position so that the displaced positions of said pin carriage represent the number of orders of the multiplicand; first sensing means for sensing the displaced positions of said pin carriage and thereby the number of first ordinal storing elements in said storing positions; second storing means having a plurality of second ordinal storing elements operable between a position of rest and storing positions for storing the orders of the multiplier; second sensing means for sensing the number of second ordinal storing elements in said storing positions; third storing means having a selected number of third ordinal storing elements for storing the orders of the result of said multiplication; and a locking device including locking means having an inoperative position and a locking position for locking said operating means, and coupling means connecting said first and second sensing means with said locking means and having a member controlled by said first and second sensing means to move said locking means to said locking position when the number of said storing elements of at least one of said first and second storing means in said storing positions, corresponding to the number of orders of a numerical value stored therein, exceeds a selected number of orders, and when the number of said storing elements of said first and second storing means in said storing positions and the displaced position of said pin carriage determines a number of orders of the result of said multiplication exceeding said selected number of third ordinal storing elements.

6. In a calculator, in combination, apparatus for preventing multiplications having a result with a number of orders greater than the capacity of the calculator, comprising a key for starting a multiplication operation of the calculator; a pin carriage having a position of rest and displaced storing positions for storing the orders of a multiplicand; first sensing means including a first sensing member for sensing the displaced positions of said pin carriage and assuming corresponding first sensing positions representing the number of the orders of the multiplicand; a register having a plurality of ordinal storing elements operable between a position of rest and storing positions for storing the orders of a multiplier; second sensing means including a second sensing member for sensing said ordinal storing elements in said storing positions and having corresponding second sensing positions, transfer means, first lost-motion means connecting said transfer means with said second sensing member, and first biassing means for urging said transfer means to move to transfer positions corresponding to said second sensing positions; locking means including a locking member having an inoperative position and a locking position for locking said key; coupling means including a first coupling member mounted on said first sensing member and a second coupling member mounted on said transfer means, second biassing means for urging said second coupling member to an operative position, said first and second coupling members having a coupled position blocking movement of said second coupling member to said operative position and a disengaged position permitting such movement; and second lost-motion means connecting said locking member with said second coupling member so that said first biassing means moves said transfer means with said second coupling member to follow in said coupled position said first coupling member and said first sensing member to said first sensing positions until said transfer means is stopped by said first lost-motion means and by said second sensing member in a transfer position whereupon in the next following first sensing position said coupling members move to said disengaged position, said second lost-motion means being arranged and constructed to connect said second coupling member with said locking member in such a manner that said second coupling member moved in said disengaged position by said second biassing means to said operative position, moves said locking member to said locking position.

7. An apparatus as set forth in claim 6 wherein at least the ordinal storing elements of the higher order include spring-loaded sensing levers movable between an inoperative and a blocking position located in the path of movement of said second sensing member, and assuming said blocking position when the respective ordinal storing element is in a storing position.

8. An apparatus as set forth in claim 6 wherein said transfer means include a lever means mounted for turning movement and having one arm supporting said second coupling member, and a member mounted on the other arm of said lever means for turning movement and having a slot, and a pin secured to said second sensing member and located in said slot, said second sensing member having another slot; a stationary pin located in said other slot, said slots and pins constituting said first lost-motion means, the lengths of said slots being selected so that said lever means can move to a selected limited number of transfer positions before said pins arrive at the ends of said slots and block further turning movement of said lever means with said second coupling member.

9. An apparatus as set forth in claim 8 wherein the length of said slot in said member mounted on said lever means corresponds to the length of the movement of said second sensing member over a distance corresponding to the spacing of a selected group of said ordinal storing elements pertaining to lower orders; and wherein said second sensing means include sensing levers mounted on said ordinal storing elements of the other higher orders, and biassed to assume a blocking position when the corresponding ordinal storing element is in a storing position, said sensing lever of the highest ordinal storing element blocking movement of said second sensing member.

10. An apparatus as set forth in claim 8 and including an abutment member for blocking turning movement of said member which is mounted on said other arm of said lever means in a selected sensing position of said second sensing member so that said lever means cannot turn to said transfer position if said second sensing member senses a number of ordinal storing elements in storing positions corresponding to a number of orders of a multiplier which exceeds the desired number of orders.

11. An apparatus as set forth in claim 10 wherein said coupling member is a double-armed lever mounted for pivotal movement on said lever means, and having an arm carrying a pin and another arm formed with a recess, wherein said first coupling member is a coupling pin secured to said first sensing member and located in said recess in said coupling position, said second biassing means including a spring connecting said coupling lever with said lever means and urging said coupling lever to turn in one direction; and wherein said locking member is a lever having an elongated slot receiving said pin on said arm of said coupling lever, said pin engaging the end of said slot in said locking member when said first and second sensing members are in sensing positions indicating a number of orders of the result of the multiplication exceeding a selected number of said ordinal storing elements of said register, so that movement of said first sensing member to the next following first sensing position causes movement of said coupling pin out of said recess, and turning of said coupling lever by said spring to a position causing movement of said locking member to said locking position.

12. An apparatus as set forth in claim 10 wherein said slot in said locking member has a main portion having said end, and another offset slot portion at the other end, said pin carried by said coupling lever being located in said offset slot end portion and disposed in such a position that said spring acting on said coupling lever urges said locking member to said locking position when said coupling pin moves to said disengaged position together with said first sensing member moving to a first sensing position.

13. An apparatus as set forth in claim 6 wherein said key includes a locking projection; and wherein said locking means include a first locking part having a slanted cam face and an abutment at the end of said slanted cam face, a spring urging said first locking part to a position in which said locking projection engages said abutment when said key is depressed, a second locking part pivotally connected with said first locking part and having a locking abutment, a third locking part connected with said locking member for movement therewith and being engaged by said locking abutment to block movement of said second locking part when said locking member is in said locking position so that said second locking part holds said first locking part in a position in which said locking projection of said key abuts said slanted cam face, while upon movement of said locking member to said inoperative position, said locking abutment is released by said third locking part and said spring turns said first locking part to a position permitting movement of said key to a depressed position for starting a multiplication operation.

14. In a calculator, in combination, apparatus for preventing multiplications having a result with a number of orders greater than the capacity of the calculator, comprising a key for starting a multiplication operation of the calculator; a pin carriage having a position of rest and displaced storing positions for storing the orders of a multiplicand; first sensing means including a first sensing member for sensing the displaced positions of said pin carriage and assuming corresponding first sensing positions representing the number of the orders of the multiplicand; a register having a plurality of ordinal storing elements operable between a position of rest and storing positions for storing the orders of a multiplier; second sensing means including a second sensing member for sensing said ordinal storing elements in said storing positions and having corresponding second sensing positions, transfer means, first lost-motion means including a pin and a slot connecting said transfer means with said second sensing member, and first biassing means for urging said transfer means to move to transfer positions corresponding to said second sensing positions; locking means including a locking member having an inoperative position and a locking position for locking said key; coupling means including a coupling pin mounted on said first sensing member and a recessed coupling member mounted on said transfer means, second biassing means for urging said recessed coupling member to an operative position, said coupling pin and coupling member having a coupled position in which said pin is located in a recess of said recessed coupling member for blocking movement of said second coupling member to said operative position and a disengaged position permitting such movement; and second lost-motion means including a pin and a slot connecting said locking member with said second coupling member so that said first biassing means moves said transfer means with said second coupling member to follow in said coupled position said coupling pin and said first sensing member to said first sensing positions until said transfer means is stopped by said first lost-motion means and by said second sensing member in a transfer position whereupon in the next following first sensing position said coupling pin moves to said disengaged position, said second lost-motion means being arranged and constructed to connect said coupling member with said locking member in such a manner that said coupling member moved in said disengaged position by said second biassing means to said operative position, moves said locking member to said locking position.

References Cited

UNITED STATES PATENTS

| | | | |
|---|---|---|---|
| 2,987,246 | 6/1961 | Wagemann ---------- | 235—61 |
| 3,005,585 | 10/1961 | Capellaro et al. ------ | 235—60 |
| 3,194,495 | 7/1965 | Gang ------------ | 235—60.15 |

RICHARD B. WILKINSON, *Primary Examiner.*

S. A. WAL, *Assistant Examiner.*